United States Patent [19]

Zahavi et al.

[11] Patent Number: 4,574,041

[45] Date of Patent: Mar. 4, 1986

[54] METHOD FOR OBTAINING A SELECTIVE SURFACE FOR COLLECTORS OF SOLAR AND OTHER RADIATION

[75] Inventors: Joseph Zahavi, Haifa; Shoshana Tamir, Tirat-Hacarmel, both of Israel

[73] Assignee: Technion Research and Development Foundation Ltd., Haifa, Israel

[21] Appl. No.: 641,253

[22] Filed: Aug. 16, 1984

[30] Foreign Application Priority Data

Aug. 16, 1983 [IL] Israel ......................................... 69507

[51] Int. Cl.[4] ........................ C25D 5/18; C25D 5/48; G02B 1/10
[52] U.S. Cl. ................................... 204/38.3; 204/27; 204/42; 204/56 R; 126/901
[58] Field of Search ................. 126/901; 204/27, 38.3, 204/42, 56 R

[56] References Cited

U.S. PATENT DOCUMENTS

| | | | |
|---|---|---|---|
| 3,011,958 | 12/1961 | White | 204/56 R |
| 3,335,074 | 8/1967 | Wright et al. | 204/56 R |
| 3,573,177 | 3/1971 | McNeil | 204/56 R |
| 3,920,413 | 11/1975 | Lowery | 126/901 |
| 4,190,321 | 2/1980 | Dorer et al. | 126/901 |
| 4,243,496 | 1/1981 | Rosset et al. | 204/56 R |
| 4,448,487 | 5/1984 | Cuomo et al. | 204/56 R |

*Primary Examiner*—Andrew H. Metz
*Assistant Examiner*—Terryence Chapman
*Attorney, Agent, or Firm*—Browdy and Neimark

[57] ABSTRACT

The present invention relates to selective surfaces for collectors of solar and other thermally useful radiation. According to the invention, a zinc-coated metal plate having a thickness of between $2\mu$ and $30\mu$ is immersed in an alkaline bath containing 2 to 30 g/l $OH^-$ and comprising sodium nitrate and sodium hydroxide. Subsequently, the anodized plate is passivated in an acidic bath which contains more than 2 g/l $H^+$. Preferred constituents in the acidic bath are selected from acidic phosphate salts, oxalic acid, chromium ions, sulfuric acid or mixtures of two or more thereof. The selective thermal radiation collector surfaces obtained possess improved radiation properties, being capable of maintaining them even under corrosive conditions.

8 Claims, No Drawings

METHOD FOR OBTAINING A SELECTIVE SURFACE FOR COLLECTORS OF SOLAR AND OTHER RADIATION

The present invention relates to selective surfaces for collectors of solar and other thermally useful radiation. More particularly, the invention relates to an improved selective surface for such collectors capable of withstanding severe corrosive conditions.

A common type of collector for solar and other radiation, used for heating water, comprises an absorber plate, which absorbs the radiation and transfers the resulting heat to the water; one or more glass covers to prevent the plates being cooled by the wind; and some means of insulation at the back of the plate. It is a well known practice to use black coloring to enhance the absorption of radiation and to reduce heat reflection. As a plate heats up, it loses heat to the surroundings in three ways: (a) by thermal radiation, (b) by convection in the air gap between the absorber and the glass cover, and (c) by heat loss through the back of the absorber.

Heat loss by radiation constituting a major portion of overall losses, most of the research in the field is concentrated on how to reduce this kind of heat loss. As is well known, all heated bodies emit thermal radiation, the amount of such radiation being a function of a property of the surface called emissivity ($\epsilon$) and, to a lesser extent, a function of the surroundings. A solar collector surface is called selective if its adsorption co-efficient ($\alpha$) is high while its emission coefficient ($\epsilon$) is low.

Blackening a metal surface by dyeing is the least expensive method but its principal disadvantage is the poor fastness of the color and particularly its low resistance to sunlight. For this reason, electrolytic treatments are preferred for the purpose, enabling the thickness and the related properties of the coatings to be closely controlled.

The main requirements for a practical selective surface of a thermal radiation collector are:
(a) High thermal radiation absorptivity ($\alpha$);
(b) Low thermal emittance ($\epsilon$);
(c) Stability against atmospheric corrosion;
(d) Applicability to given substrate materials; and
(e) Reasonable cost.

A selective coating applied to a solar radiation absorber sheet, for example, provides the practical advantage of increasing the efficiency of the heating process by reducing re-radiation heat losses from the collector of which the sheet forms part. The hotter the absorber sheet, the more heat will be transferred to the circulating fluid, whereby the overall performance of the systems is enhanced.

In practice it is not easy to obtain high values, since even black paints, which in any case are not particularly suitable, rarely have an absorptivity, $\alpha$, greater than 0.95, a value that is moreover liable to drop after some time for a variety of reasons, principally the paint's fading. Conventional selective coatings are invariably quite thin because, if the thickness is increased in an effort to increase $\alpha$, the emissivity, $\epsilon$, tends to increase appreciably. Interference effects in the thin films have been used to reduce reflectivity to near zero at a predetermined point of the solar spectrum; and with more complex optical multi-layer coatings the near-zero reflectance can be made to be applicable to a wide range of the solar spectrum. Such coatings are, however, unlikely to be viable economically except, possibly, in high-concentration collectors, where the total absorber surface area to be treated is small compared with the total collection area.

One of the problems recognized by all persons skilled in the art of solar collectors is the achievement of stability against atmospheric corrosion. As will be realized, it is extremely difficult to obtain good stability of exposed surfaces also required to have the very specific optical properties characterizing a selective surface. It has been stated by persons versed in the art that it is almost impossible to leave a selective surface without a protective window, but even then, some deterioration in the absorptive properties of the selective surface is encountered due to the persistent corrosive effects of the environment.

Four types of selective surfaces are known: (1) multi-layer coatings on metal substrates, wherein layers of materials of controlled thicknesses are deposited in vacuo; (2) semiconductors, which usually are opaque materials exhibiting strong absorption for (visible) solar wave lengths plus good reflectance toward the infra red; (3) radiation trapping surfaces, incorporating porous structures that trap short-wavelength light thereby increasing the solar absorptance, and (4) thin films, which rely on process control to provide optimum film thickness for selectivity. The latter type is the most frequently encountered, being also the most economical to produce.

A simple spectrally selective absorber, described in a recent paper by M. van der Leij (J. Electrochem. Soc., Solid-State Science and Technology, Vol. 125, August 1978, p. 1361-1364), consists of a metal substrate covered with a thin semiconductor film. The semi-conductor must have a high absorptivity for wavelengths shorter than 2.2 $\mu$m and a high transmissivity for wavelengths longer than 2.2 $\mu$m. More particularly the black oxide films were deposited on a steel surface electroplated with zinc using an alternating current in solutions that contain $NaNO_3$ and 10-3 g/l $NaOH$ with or without $NaClO_3$. The duration of the anodizing treatment is mentioned to be between 1 to 3 minutes. The films obtained indeed possessed improved radiation characteristics, being in the range, 0.08 to 0.17. However, the oxide films failed when tested in accelerated corrosion conditions, so that the surface ceased to be considered selective after only one year. The brief review given above clearly explains the existence of a long-felt need for a selective solar radiation collector surface that is resistant to corrosion.

It is accordingly an object of the present invention to provide a method for obtaining a selective thermal radiation collector surface possessing improved radiation properties and capable of maintaining them even under corrosive conditions. It is another object of the present invention to provide a simple method for obtaining selective thermal radiation collector surfaces with unimpaired radiation properties.

The invention consists in a method for obtaining a selective surface for thermal, and particularly solar, radiation collectors which comprises the steps of:
(a) anodizing by alternating current density in a range of 5-60 A/dm$^2$—a zinc-coated metal plate of a thickness in the range of 2$\mu$ to 30$\mu$, immersed in an alkaline bath containing between 2 to 30 g/l $OH^-$, and
(b) passivating said anodized plate in an acidic bath containing more than 2 g/l $H^+$.

The selective surface on the metal plate obtained according to the method of the present invention is characterized by its outstanding stability even under corrosive conditions. Selective surfaces obtained in accordance with the present invention did not show any change in their low emissivity after 10 hours of salt spray testing, as against a substantial decrease, after only one hour's salt spray testing, in that property of selective surfaces not treated with the last-named step, viz. passivation. It was, in addition, unexpectedly found that the acidic passivation step does not affect the absorption coefficient, $\alpha$, any more than the emissivity $\epsilon$.

The step of acidic passivation is very simple and does not materially increase the operational cost of obtaining the selective surfaces in accordance with the present invention. The step involves the simple insertion of the anodized metal-covered metal surface into an acidic bath for a short time in the order of seconds.

In a lecture given by the inventors on the development of a selective surface for solar radiation collectors on galvanized steel (Proceedings of Materials Engineering Conference, December 1981, Technion, Israel) a method was described for obtaining a selective surface which comprises the passivation of anodized Zn-coated metal plate in an alkaline potassium dichromate solution. While the method suggested has some merits, it requires a thickness of at least $10\mu$ Zn. As known, to get thickness of such order is quite expensive which reduces the actual use of the method. Moreover, the selective surfaces obtained were shown to possess improved radiation properties which were stable under ordinary, but not under corrosive, conditions. It is, however, well known that solar collectors, being installed in the open air, have to withstand corrosive conditions that are often unavoidable. The improved radiation properties of the selective surfaces obtained by the method of the present invention are illustrated by their basic parameters, viz. absorptivity, $\alpha$, which is in the range, 0.86 to 0.95, and emissivity, $\epsilon$, which is in the range of 0.06 to 0.10. The selective surfaces obtained by the method of the present invention are further characterized by the durability of their coating, which is an important factor in determing the service life of the collector. This should be at least eight years. During that time the reduction in the solar radiation gathering performance due to the degradation of the coating is avoided. In order to obtain consistent selective properties, it is suggested to control the thickness of the deposited layer and the conditions of deposition in order to keep them as uniform as possible.

The metal to be utilized as substrate may be selected from any of the commercially available varieties of Zn-coated metal, or Zn, or Zn-alloy, such as $Al_4Zn_{96}$. Any galvanized or dip-coated plate with a Zn coating will also suffice. In a preferred experiment, using Zn-coated steel plate as substrate material, the metal plate was heavily Zn-electroplated in a cyanide bath prior to anodizing, resulting in a zince coating of a thickness in the range of 12 to 20 microns. A thickness smaller than about 10 microns would generally reduce corrosion resistance of the final product and thus might not be preferred, while any greater thickness would produce no added advantage but would naturally be considerably more expensive.

The zinc-coated plate was then cleaned in an alkaline bath, which treatment was followed by acidic etching. The actual anodizing step was carried out with alternating current in the density range of 5 to 60 $A/dm^2$ and preferably 10–40 $A/dm^2$ in a solution containing sodium nitrate and sodium hydroxide, the latter in a concentration of 2 to 30 g/l $OH^-$ and preferably 4.2–17 g/l $OH^-$. In order to optimize the radiation characteristics, the bath composition, current density, and time of anodizing may be varied in the manner known to any person skilled in the art. Generally speaking, the concentration of $NaNO_3$ in the anodizing bath should be in the ranges of 15 to 30 grams/liter ($NaNO_3$), and a temperature of about 30° C. When the a.c. densi ty is between 15 and 25 amperes per square decimeter, the time required will be less than 1 min. After this step the anodized plate will have an absorptivity, $\alpha$, of about 0.95 and an emissivity, $\epsilon$, of about 0.12.

The subsequent treatment of passivation in an acidic bath is a step of great importance to the present invention, since it is that treatment which imparts to the selective surface its outstanding stability even under severely corrosive conditions. It was quite surprisingly found that acidic passivation, when following the anodizing by alternating current of a Zn-coated plate, neither reduces the absorptivity nor increases the emissivity, of the selective surface. After this passivation treatment the $\alpha$ and $\epsilon$ values remained substantially unchanged.

There are several acidic compositions capable of imparting anti-corrosive stability to the selective surface of the collector. The more important groups that are suitable are as follows: acidic phosphate salt solutions, oxalic acid, chromic acid, sulfuric acid, or mixtures of two or more of these ingredients. A person skilled in the art will be able to select the preferred acid-salt compositions to accord with the specific requirements and available facilities. In particular, an acid salt solution containing potassium dichromate and sulfuric acid with a minimum 2 g/l $H^+$ was found to be most suitable for the present invention, the following concentration ranges proving advantageous:

Sulfuric acid: 2 to 20 ml/l,
Potassium dichromate: 80 to 200 grams/liter.

With an acid bath as described the insertion time required for achieving sufficient passivation is of the order of a few seconds and generally not above 5 seconds.

The stability of the selective surface was tested in accordance with ASTM B.117 by the salt spray method, considered to be the most drastic test for this purpose. Even after 10 hours no sign of deterioration could be detected, the reflective properties of the selective surface, as characterized by the $\alpha$ and $\epsilon$ values, having remained unaffected. This stability makes it reasonable to predict that the selective surface according to the present invention should remain stable for at least eight years with the reflective properties unimpaired.

Ultra-violet radiation is an important component of solar radiation, and the anodized and twice passivated plates were accordingly subjected to UV rays. A visual inspection of the irradiated plates did not disclose any fading or other deterioration of the blacking, and this was corroborated by other tests showing that there was no impairment of the absorptivity ($\alpha$), while emissivity ($\epsilon$) increased by a mere 10%. Summarizing this test it can be stated that the surface treated in accordance with the present invention stands up well to ultra-violet radiation and that its selectivity is maintained. Numerically, the results were as follows:

| Absorptivity | Emissivity |
|---|---|
| Before UV irradiation 0.94 | 0.34 |
| After UV irradiation 0.95 | 0.44 |

Although the acidic bath exemplified is shown to contain chromium ions, it should be understood that other acidic baths known for their metal passivation properties may be used provided that they serve to keep the $\alpha$ and $\epsilon$ parameters stable, both during passivation and in service. Prima facie it would, however, seem that an acidic bath containing chromium ions will be the preferred formulation. A preferred acidic bath will contain at least 5 g/l $H^+$.

The passivated Zn-coated plate obtained according to the present invention was found to possess improved conductivity and can be useful for other purposes wherein a persistent black plate is required such as in the electronic industry.

While the invention will in the following Examples be described with the aid of certain preferred embodiments, it should be understood that these are not intended to limit the invention to the their particular conditions. On the contrary it is intended to cover all alternatives, modifications and equivalents as may be included within the scope of the invention as defined by the appended claims.

Thus, the following Examples which include preferred embodiments will serve to illustrate the practice of this invention, it being understood that the particulars described are by way of example and for purposes of illustrative discussion of preferred embodiments of the present invention only.

EXAMPLE 1

A metal plate having a zinc coating of a thickness of 13–17$\mu$ was anodized for 1 minute in a bath containing 25 g/l NaOH and 20 g/l NaNO$_3$ at a temperature of about 30° C. The current density was 20 A/dm$^2$.

The anodized plate was subsequently passivated by immersing it for 3 seconds in an acidic bath containing K$_2$CR$_2$O$_7$ 130 g/l and H$_2$SO$_4$ (conc) 8 ml/l.

The plate obtained had an absorption coefficient ($\alpha$) of 0.86 and emission coefficient ($\epsilon$) of 0.009.

EXAMPLE 2

A metal plate having a coating of 2–2.7$\mu$ zinc, was anodized for 45 seconds in a bath having the same composition as in Example 1, at a temperature of about 30° C. The passivation was performed as in Example 1 under the same conditions. The plate obtained had $\alpha$ of 0.85 and $\epsilon$ of 0.07. After salt spraying test for ten hours, the above properties remained substantially unchanged, the values of the above coefficient being: $\alpha=0.89$ and $\epsilon=0.07$.

We claim:

1. A method for obtaining a selective surface for thermal, and particularly solar, radiation collectors which comprises the steps of:
   (a) anodizing by alternating current in a density range of between 5 to 60 A/dm$^2$ a zinc-coated metal plate of a thickness in the range of between 2$\mu$ to 30$\mu$, said plate being immersed in an alkaline bath containing between 2 to 30 g/l $OH^-$, and
   (b) passivating said anodized plate in an acidic bath containing more than 2 g/l $H^+$.

2. The method according to claim 1, wherein the zinc-coating has a thickness in the range of between 10 to 20 micrometers.

3. The method according to claim 1, wherein the anodizing step (a) is carried out in a bath comprising sodium nitrate of a concentration in the range of between 15 to 30 g/l and sodium hydroxide of a concentration in the range of between 15 to 30 g/l.

4. The method according to claim 3, wherein the current density is is in the density range of between 15 to 25 amperes per square decimeter.

5. The method according to claim 1, wherein the acidic passivation step (b) is carried out by immersing the anodized metal plate in an acidic bath comprising a constituent selected from the group consisting of acidic phosphate salt solutions, oxalic acid, chromium ions, sulfuric acid, or mixtures of two or more of these constituents having at least 2 g/l $H^+$.

6. A method according to claim 5, wherein said acidic bath contains more than 5 g/l $H^+$.

7. The method according to claim 5, wherein the acidic bath consists of a mixture of sulfuric acid and potassium dichromate.

8. The method according to claim 7, wherein the concentration ranges of said sulfuric acid and potassium dichromate are:
   Sulfuric acid: in the range of 2 to 20 ml/l, and
   Potassium dichromate: in the range of 80 to 200 g/l.

* * * * *